United States Patent [19]

Helton

[11] Patent Number: 5,017,081
[45] Date of Patent: May 21, 1991

[54] TRUSS TRANSPORTATION TRAILER

[76] Inventor: Jesse D. Helton, Box 638, Crocker, Mo. 65452

[21] Appl. No.: 206,486

[22] Filed: Jun. 13, 1988

Related U.S. Application Data

[63] Continuation-in-part of Ser. No. 64,833, Jun. 22, 1987, Pat. No. 4,750,785.

[51] Int. Cl.⁵ .............................. B60P 1/16; B60P 3/40
[52] U.S. Cl. ..................................... 414/470; 414/482
[58] Field of Search ............... 414/458, 459, 460, 461, 414/470, 477, 482

[56] References Cited

U.S. PATENT DOCUMENTS

| | | | |
|---|---|---|---|
| 3,399,791 | 9/1968 | Goodwin | 414/470 |
| 3,724,696 | 4/1973 | Leeper | 414/495 |
| 3,854,615 | 12/1974 | List | 414/470 |
| 4,750,785 | 6/1988 | Helton | 414/10 X |

Primary Examiner—Robert P. Olszewski
Assistant Examiner—Janice Krizek
Attorney, Agent, or Firm—Edward R. Weber

[57] ABSTRACT

An improved truss transportation trailer which provides a truss support trailer that may be easily and safely controlled by a single operator and which can be utilized to transport a large variety of truss sizes and configurations safely from the point of manufacture to the point of use, which improvements include stabilizing and locking devices.

18 Claims, 4 Drawing Sheets

FIG. 1

PRIOR ART

TRUSS TRANSPORTATION TRAILER

The present application is a continuation-in-part application under 35 USC 120 of prior application Ser. No. 07/064,833, filed June 22, 1987, which has now matured into U.S. Pat. No. 4,750,785.

FIELD OF THE INVENTION

The present invention relates to an improved trailer for hauling prefabricated roof trusses, and more particularly, to a trailer which incorporates power assisted devices and stabilizing and safety devices to permit a single operator to adapt the trailer to accommodate various sizes of trusses and to safely operate the trailer when unloading said trusses.

BACKGROUND OF THE INVENTION

Increased building costs and improvements in the ability to construct effective roof trusses have resulted in an increasing use of prefabricated roof trusses in the construction of both commercial and residential buildings. Roof trusses, which are assembled at a manufacturing facility, are moved to the job site most commonly on a tractor-trailer operated on the highway system. Because of the differing requirements of the buildings, the dimensions and configurations of the trusses vary markedly from building to building. As a result, the trailers utilized to transport the trusses must be capable of adaptation in order to handle the various sizes and configurations of trusses which may be fabricated in a single manufacturing plant.

Conventional tractor-trailer combinations for moving trusses consist of a standard over-the-road tractor equipped with a "fifth wheel" coupler by which a trailer may be connected to the tractor. A first bolster is mounted above the trailer portion of the "fifth wheel" coupler to support the front end of the trusses. An independent rear trailer is equipped with a similar bolster to support the rear end of the trusses. The independent trailer/bolster assembly is connected to the "fifth wheel" coupling mechanism through a pipe structure. The distance between the front bolster and the rear bolster may be adjusted by moving the trailer along a cylindrical pipe which serves as the backbone of the truck. In cases where the trusses have a high pitch or are very long, a vertical extension may be added to the front and rear bolsters to increase the height thereof so that longer or deeper trusses may be carried on the tractor-trailer without the apex of the truss dragging on the ground.

Adapting the trailers for various sizes of trusses is quite labor intensive. Adjusting the distance between the front and rear bolsters usually requires two people; one person to drive the tractor and one person to signal the driver when locking holes are lined up in the pipe structure. Several men are required to carry the vertical extension bolsters and mount them on the truck when increased height is needed. If the tractor breaks down, it becomes necessary to unload the trusses before the tractor can be moved away from the trailer and a new tractor connected. This process as well requires numerous men to effect.

Another problem with conventional tractor-trailer combinations is the inability to adjust the height of the load after the trusses are mounted. This can create an extreme safety hazard. In one known instance, a tractor-trailer carrying trusses attempted to cross a railroad grade crossing. The clearance was such that the trusses grounded on the center of the grade and effectively "hung up" the tractor-trailer combination. Before the tractor-trailer could be moved from the railroad crossing, it was necessary to get additional equipment to unload the trusses. Obviously if a train had arrived in the meantime, the results could have been disastrous.

Accordingly one object of the instant invention is to provide a trailer which is capable of standing alone in a loaded condition. A further object of the invention is to provide a trailer which may be adjusted in length by one man. Yet another object of the instant invention is to provide a trailer which can be adjusted in height in either the loaded or unloaded condition. Still another object of the invention is to provide a trailer which is stable in instances where the load on one side of the trailer exceeds the load on the opposite side of the trailer. These and other objects and advantages of the present invention will be in part apparent and in part pointed out hereinafter.

BRIEF DESCRIPTION OF THE DRAWINGS

When considering the following detailed description in conjunction with the drawings.

DETAILED DESCRIPTION OF THE INVENTION

Figure 1:
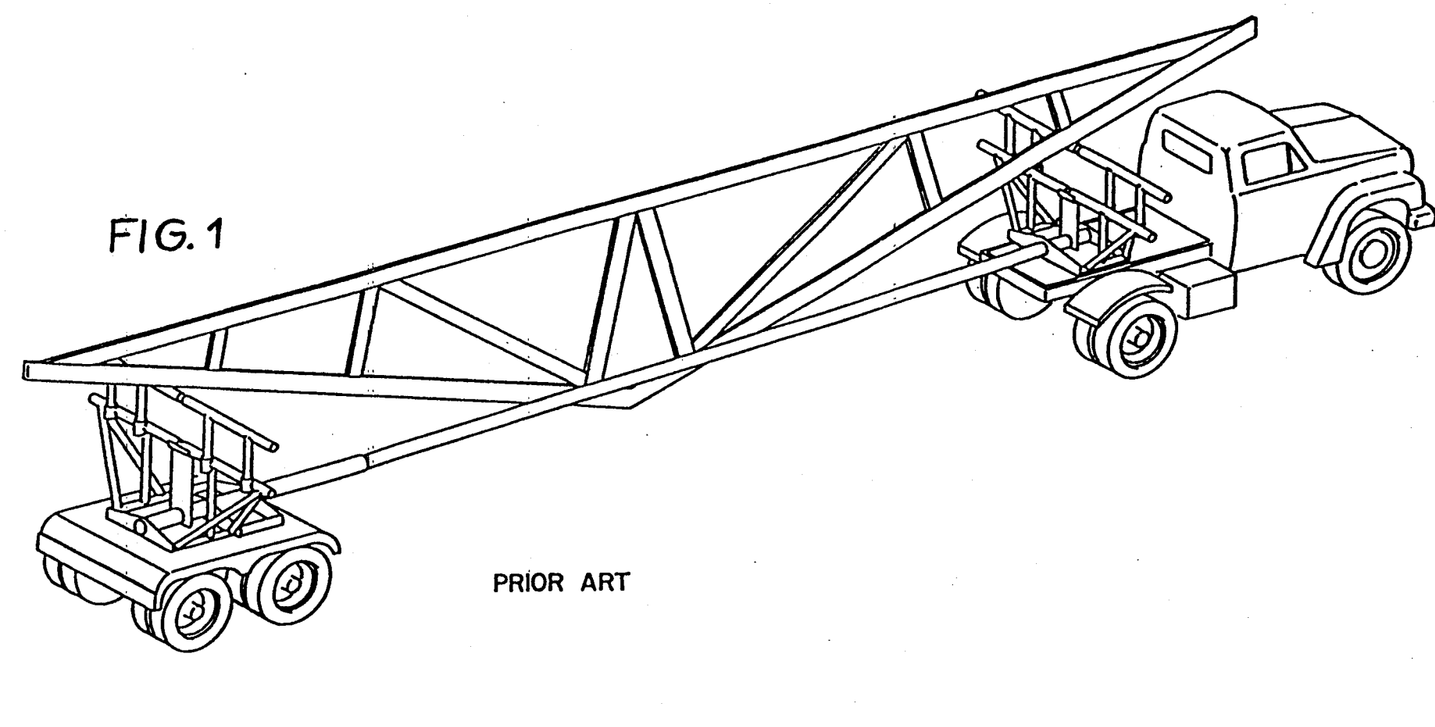
FIG. 1 is a pictorial drawing showing a conventional tractor-trailer arrangement.
Figures 2, 3, 4:
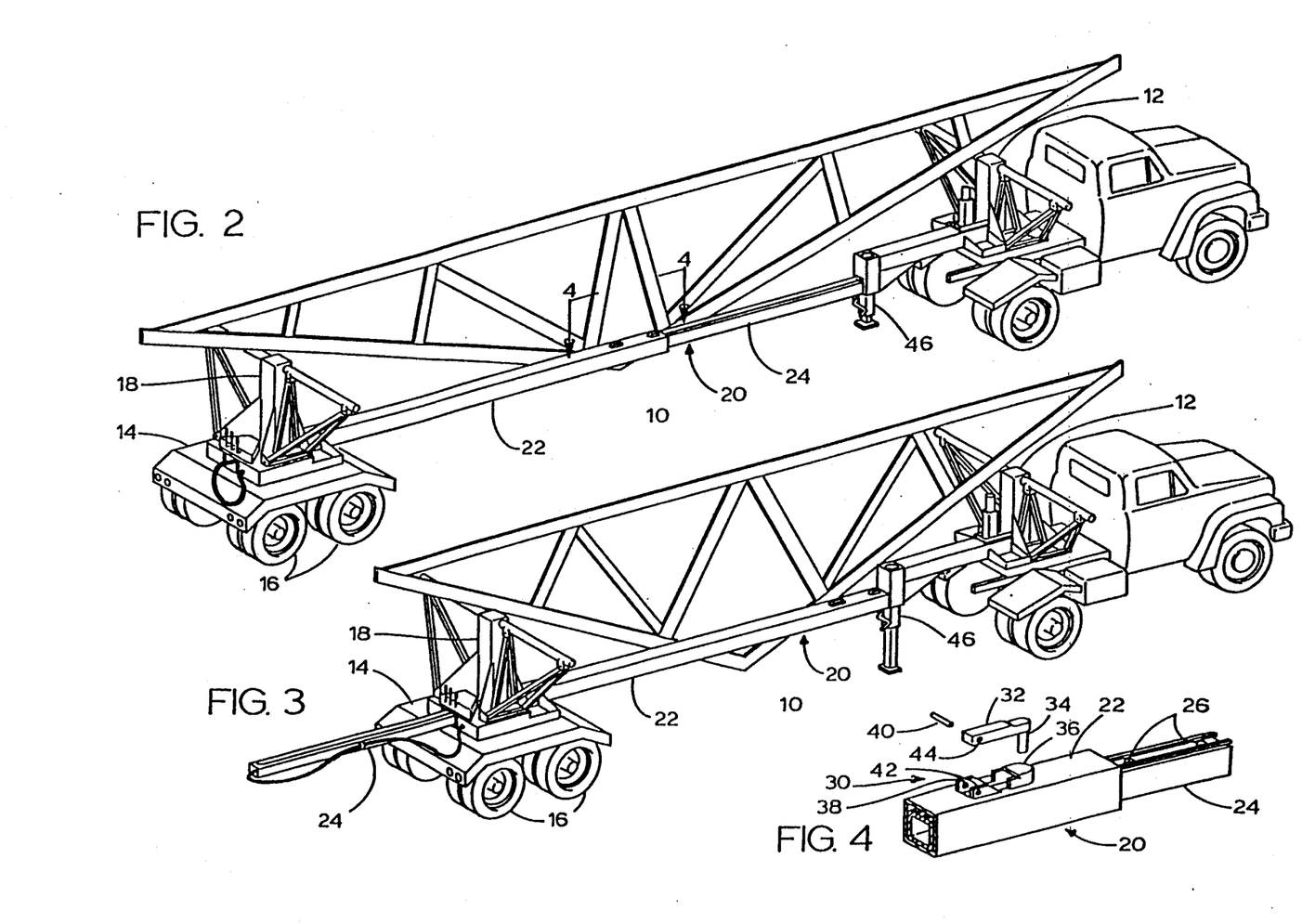
FIG. 2 is a similar drawing of the trailer of the instant invention in its lengthened state.
FIG. 3 shows the trailer of the instant invention in the shortened state.
FIG. 4 is a close-up view of the unique length locking device taken along lines 4—4 of FIG. 2.

Referring now to the drawings wherein like reference characters represent like elements, FIG. 2 shows a trailer generally designated as 10 comprised of a front truss supporting bolster 12, which is fitted with a conventional fifth wheel attachment mechanism (not shown), and a rear trailer assembly 14 comprised of a conventional wheel and axle mechanism 16 and a rear truss supporting bolster 18. Rear trailer assembly 14 is connected to front truss supporting bolster 12 by an extendable/retractable box beam 20. Comparing FIG. 2 and FIG. 3, it will be seen that rear trailer assembly 14 can be moved closer to or farther away from front truss supporting bolster 12 by positioning it at various locations along extendable/retractable box beam 20.

FIG. 4 illustrates in greater detail a portion of the components of extendable/retractable box beam 20. As will be seen, extendable/retractable box beam 20 is composed of an outer box beam 22 in sliding relationship with an inner box beam 24. Sleeved holes 26 are provided at intervals along inner box beam 24, the purpose of which will become apparent. Outer box beam 22 is provided with a positive lock mechanism 30 consisting of a lock retainer 36 and a lock safety 38. Outer box beam 22 is additionally slotted in the area defined by lock retainer 36 and lock safety 38 so that free access may be obtained to inner box beam 24 in this area. The combination inner box beam/outer box beam assembly is further provided with a means for moving outer box beam 22 in relationship to inner box beam 24. This means (not shown) may be of any of the conventional structures known, such as an hydraulic cylinder, an electric motor, an electric chain winch, an endless chain mechanism, or any other conventional structure suitable for moving one piece laterally in relationship to a second piece. Positive lock mechanism 30 further consists of a lock body 32 fitted with lock bar 34. The relationship of the various components will become apparent as the means of adjusting the length of the trailer is described.

To adjust the length of the trailer, the operator parks the tractor-trailer combination, sets the brake on the tractor, and turns off the engine. He then removes a control mechanism (not shown), which includes means for operating the power means which adjusts the length of expandable/retractable box beam 20. He then unlocks the beams. This procedure is the exact opposite of that hereinafter described for locking the beams and will be fully understood from reading that description. As inner box beam 24 moves in relationship to outer box beam 22, one of a plurality of holes 26 will periodically appear in the slot cut in outer box beam 22, the perimeter of which is defined by lock retainer 36 and a lock safety 38. Holes 26 are sleeved and are sized to slidably engage lock bar 34. When the desired separation between front bolster 12 and rear bolster 18 has been attained, the operator adjusts the length so that one of holes 26 appears in the aforementioned slot. Positive lock 30 is then placed within lock retainer 36 so that lock bar 34 engages the selected hole 26. The relationship of outer box beam 22 and inner box beam 24 is then further adjusted so that the end of positive lock body 32, immediately over lock bar 34, passes into the covered recess created by lock retainer 36. At this point, it will be noted that the relationship of outer box beam 22 and inner box beam 24 is now fixed. Due to the covered recess in lock retainer 36, it would be impossible to remove positive lock 30. As an additional safety feature to prevent decoupling of this relationship, locking safety pin 40 is passed through hole 42 in lock safety 38 and hole 44 in lock body 32. Locking safety pin 40 can be retained in position by use of a cotter pin, hair pin, or any of the numerous devices commonly used to retain a pin in place.

Front bolster 12 is further provided with a front trailer support 46, which may be extended or retracted by any of the various conventional means. When front trailer support 46 is extended so that it makes contact with the ground, front bolster 12 may be sufficiently raised to permit the fifth wheel mechanism to be disengaged, thus allowing the tractor to be moved away from the trailer. This is particularly advantageous in the event of a breakdown of the tractor as it permits a substitute tractor to be attached to the trailer assembly without the need for removing the load. The ability to utilize front trailer support 46 to support the front end of the trailer when in a loaded condition is a result of the rigidity furnished by the mated inner and outer box beams. Where a cylindrical structure is utilized, as on conventional trailers, sufficient lateral stability is not provided and any attempt to support the front bolster results in a twisting whereupon the trusses on one side or the other of the trailer are permitted to slide onto the ground.

Figure 5:
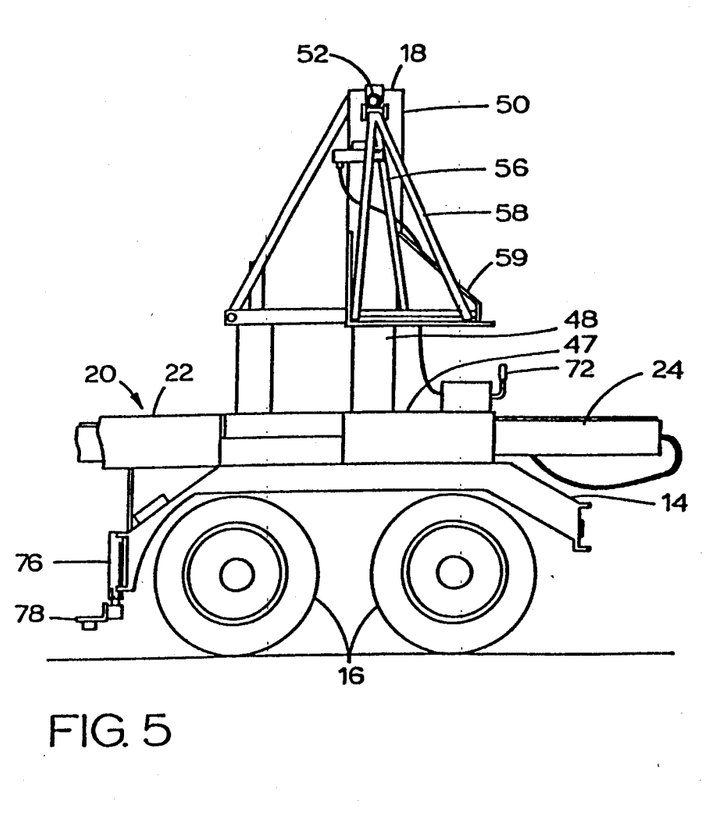
FIG. 5 is a partial view of the truss trailer showing the rear trailer assembly and the truss carrying bolster from the side.
Figure 6:
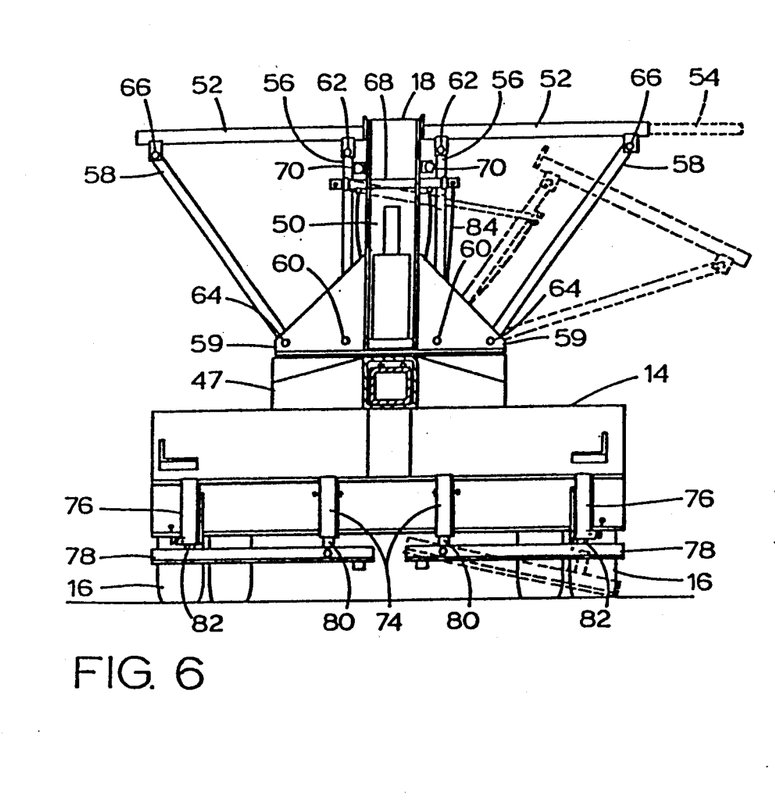
FIG. 6 is a view of the rear trailer shown in FIG. 5 from the tractor looking towards the rear of the assembly.

Considering now FIGS. 5 and 6, the unique construction of the bolster assembly will be described. The front and rear bolsters are identical; the front bolster being mounted above the fifth wheel connection mechanism and the rear bolster being mounted upon rear trailer assembly 14. The bolsters consist of a bolster base 47, which is mounted directly upon rear trailer assembly 14 or the fifth wheel connection device and is strongly braced so as to rigidly support inner bolster riser 48 which is perpendicular to bolster base 47. Outer bolster riser 50 surrounds inner bolster riser 48 in slidable engagement. Outer bolster riser 50 and inner bolster riser 48 are so sized and constructed as to permit outer bolster riser 50 to move freely along inner bolster riser 48 without any tipping or twisting occurring.

Affixed to outer bolster riser 50 are left and right truss support mechanisms. These mechanisms are mirror images of each other. Each mechanism is comprised of truss support 52, which may be optionally equipped with an extension 54 to increase the number of trusses which may be carried. Truss support 52 is attached to outer bolster riser 50 by inner truss support riser 56 and outer truss support riser 58. These truss support risers are fastened to outer bolster riser 50 via bolster riser pivot plate 59, which is rigidly affixed to outer bolster riser 50. Inner truss support riser 56 is affixed to bolster riser pivot plate 59 at inner truss support riser lower pivot point 60 and to truss support 52 at inner truss support riser upper pivot point 62. Likewise, the outer truss support riser 58 is affixed to the bolster riser pivot plate 59 at outer truss support riser lower pivot point 64 and to truss support 52 at outer truss support riser upper pivot point 66. It will be noted in FIG. 6 that when truss support 52 is in its truss carrying position, inner truss support riser 56 is essentially perpendicular to truss support 52 and parallel to outer bolster riser 50. It will be further noted that outer truss support riser upper pivot point 66 is near the outer end of truss support 52, whereas outer truss support riser lower pivot point 64 is substantially closer to inner truss support riser lower pivot point 60. This results in outer truss support riser 58 being appreciably longer than inner truss support riser 56 and creates a diagonal brace to support the outer end of truss support 52.

The positioning of the left and right truss support assemblies is controlled by a truss support control cylinder 68 and left and right locking mechanisms 70. Truss support cylinder 68 is a double acting hydraulic cylinder which is activated by a control 72 which selectively lowers or raises either the left-hand truss support 52 or the right-hand truss support 52. Each locking mechanism 70 is rigidly attached to outer bolster riser 50 and comprises a spring loaded plunger (not shown) which engages inner truss support riser 56 so as to lock it in a vertical position and lock truss support 52 in an horizontal load supporting position. Locking mechanism 70 further comprises a solenoid device which can be activated to withdraw the plunger and thus release inner truss support device 56 from its locked vertical position. When it is desired to unload the trusses carried upon truss support 52, a switch is activated adjacent to control 72. This switch will energize both solenoids on either the left-hand side or the right-hand side of the vehicle thus releasing both the front and rear truss support mechanisms on either the left side or right side of the truss support trailer. Control 72 is then moved in a direction that activates truss support cylinder 68. Truss support control cylinder 68 will elongate and slowly cause inner truss support riser 56 and outer truss support riser 58 to pivot about their respective lower pivot points and thus move truss support 52. As a result of the spacing of the inner and outer truss support lower pivot points 60 and 64, respectively, and the difference in length of inner truss support riser 56 and outer truss support riser 58, a unique unloading action occurs in that truss support 52 will move laterally away from the vehicle before the outer end begins to lower towards the ground. This has the effect of moving the trusses outward from the vehicle so that when they slide from truss support 52 and fall onto the ground, their inner most end will be outside of the tread width of the trailer and thus permit the trailer to be driven away without the necessity of moving the trusses. Following the unloading of the trusses, control 72 is then moved in the opposite direction. Truss support control cylinder 68 retracts and returns truss support 52 to its raised horizontal position and locking mechanism 70 automatically activates and locks the support in this position. Because of the use of the double acting power cylinder, it is possible to raise truss support 52 to its horizontal position even when a load is on the truss support. Thus it is possible to unload only part of the trusses carried on the truss support. This is accomplished by firmly chaining the inner trusses to truss support 52 and inner truss support riser 56. When truss support control cylinder 68 is activated, truss support 52 tilts until the unrestrained outer trusses slide to the ground. When truss support control cylinder 68 is retracted, the inner trusses, which have been chained to truss support 52 and inner truss support riser 56, are returned to the carrying position along with truss support 52.

Figure 8:
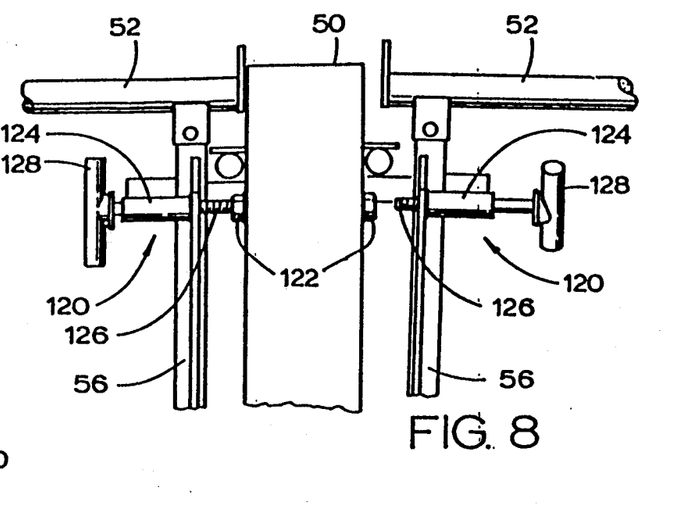
FIG. 8 is a partial view of a bolster-truss support assembly showing the optional means of locking the truss support in the load supporting position.

To positively lock truss support 52 in its upright truss supporting position and to ensure that vibration from over the road hauling or other factors do not permit truss support 52 to discharge the trusses accidentally, each truss support mechanism may be provided with a locking mechanism 120 (FIG. 8), which consists of an internally threaded member 122 rigidly affixed to outer bolster riser 50, and a tubular member 124, rigidly affixed to inner truss support riser 56. Tubular member 124 is positioned so that the axis of internally threaded member 122 and tubular member 124 are in alignment when truss support 52 is in its horizontal load supporting position. An externally threaded member 126 is sized to pass through tubular member 124 and to mate with internally threaded member 122. Externally threaded member 126 is also provided with a handle 128 by which externally threaded member 126 can be rotated. Locking mechanism 120 may be engaged when truss support 52 is in its horizontal load supporting position. Inner truss support 56 will be essentially vertical and internally threaded member 122 and tubular member 124 will be aligned. To engage locking mechanism 120, externally threaded member 126 is passed through tubular member 124 and caused to engage internally threaded member 122. It can be seen that by rotating handle 128, externally threaded member 126 can be caused to mate with internally threaded member 122 and thus effectively lock inner truss support riser 56 in a fixed relationship with respect to outer bolster riser 50.

Additional control devices, which are not shown, can also be provided in the vicinity of control 72 which will permit selective raising and lowering of the outer bolster riser with respect to the inner bolster riser at either the front or rear of the trailer. This is most conveniently accomplished with an hydraulic cylinder mounted upon inner bolster riser 48. The cylinder or other lifting device will have sufficient power to raise and lower the outer bolster riser 50 even when a full load of trusses is carried on truss support 52.

It is thus seen that it is possible to carry the trusses with a minimum amount of ground clearance when the trailer is operating on a smooth surface and to increase the ground clearance by raising the outer bolster risers when carrying the trusses over rough ground or over humps in the road, such as might be encountered at a railroad grade crossing, where the trusses may drag on the ground and hang up the trailer.

Figure 7:
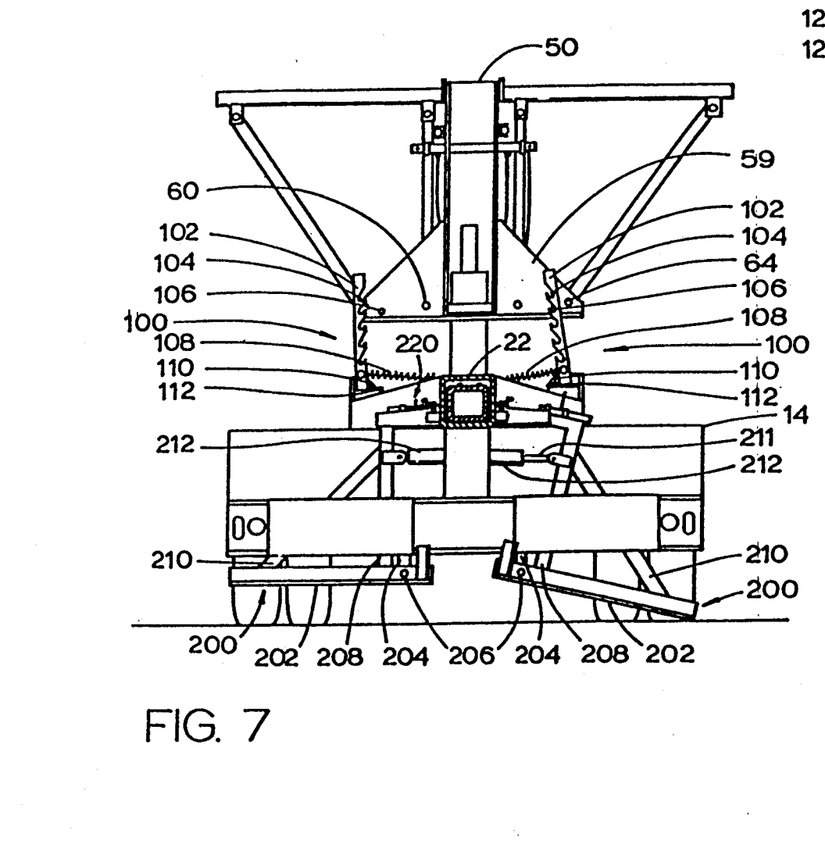
FIG. 7 is a view of an alternate configuration of the rear trailer assembly showing the bolster stabilizer bars and an alternate design of a mono truss support.

At times the number or configuration of the trusses carried will result in a situation where the load on one side of the truss trailer will be significantly different from the load on the opposite side of the trailer. Normally this will not be a problem. However, each of the front and rear truss support bolsters can be optionally fitted with an automatic bolster stabilizer assembly 100 (FIG. 7). This assembly consists of mirror image structures mounted onto opposite sides of the outer bolster risers. Each mirror image structure is composed of a bolster stabilizer bar 102 which has one end pivotally mounted onto bolster base 47 at a point laterally distant from inner bolster riser 48. Bolster stabilizer bar 102 has a plurality of hook-shaped cutouts 104 which are oriented so that the hook is facing in an upward direction. The hook-shaped cutouts are sized to mate with pin 106, which is affixed to bolster riser pivot plate 59 at a point intermediate to inner truss support riser lower pivot point 60 and outer truss support riser lower pivot point 64. Automatic bolster stabilizer assembly 100 is further equipped with springs 108 which causes the bolster stabilizer bar 102 to be biased inwardly toward outer bolster riser 50. In addition, automatic bolster stabilizer assembly 100 is provided with a lever 110 and a latch 112 which may be utilized to overcome the biasing tendency of spring 108 and prevent bolster stabilizer bar 102 from rotating inwardly.

In use, when the outer bolster riser 50 is at its lowest elevation, bolster stabilizer bar 102 will rotate inwardly so that the lowest of hook-shaped cutouts 104 will engage pin 106. As outer bolster riser 50 is elevated, pin 106 will rise with bolster riser pivot plate 59 and progressively cause bolster stabilizer bar 102 to rotate in an outward direction so that pin 106 will progressively engage successive hook-shaped cutouts 104. Once the desired height is reached, the bolster is lowered sufficiently to cause pin 106 to firmly engage the appropriate hook-shaped cutout 104. As a result of the lateral spacing of bolster stabilizer bars 102 on either side of bolster outer riser 50, the stabilizer bars now serve to provide additional support for outer bolster 50 in its elevated position and to reduce any tipping of outer bolster riser 50 with respect to bolster base 47.

To lower the bolster, the bolster is first elevated sufficiently to permit pin 106 to disengage from hook-shaped cutout 104. Bolster stabilizer bar 102 is then rotated away from pin 106 against the bias of spring 108 and maintained in this rotated position by engaging lever 110 with latch 112. At this point outer bolster riser 50 can be lowered to any elevation desired. When lever 110 is disengaged from latch 112, spring 108 will cause bolster stabilizer bar 102 to rotate inwardly and engage pin 106. Slight manipulation of the elevation of outer bolster riser 50 will allow the bolster riser to be locked into position by engaging pin 106 with the appropriate hook-shaped cutout 104 on bolster stabilizer bar 102. It will thus be understood that automatic bolster stabilizer assembly 100 provides an easy, safe means of locking outer bolster riser 50 at any desired elevation and provides added support to resist tipping of outer bolster riser 50 as a result of an unbalanced load.

On occasion, the building which is being constructed will require trusses which are angled only on one side. These are commonly called "mono trusses". To handle the mono trusses, rear trailer assembly 14 may be equipped with an auxiliary member to support the apex of the mono truss. This auxiliary support mechanism consists of an inner mono truss support 74 and an outer mono truss support 76, which are rigidly affixed to the forward portion of rear trailer assembly 14. The support mechanism itself consists of a mono truss support 78 to which are pivotally affixed an inner leg 80 and an outer leg 82. The inner and outer legs are sized to slidably fit within inner mono truss support 74 and outer mono truss support 76. When mono truss support 78 is mounted on the trailer, inner leg 80 is firmly supported within inner mono truss support 74. Outer leg 82 is releasably supported within outer mono truss support 76. For over-the-road hauling, the trusses are loaded with the apex resting upon mono truss support 78. At the building site, mono truss support control cable 84 is connected to the point where truss support control cylinder 68 is attached to inner truss support riser 56. Mono truss support control cable 84 is flexible and of sufficient strength to hold the outer end of mono truss support 78 in its raised position. Once mono truss support control cable 84 is attached, the lock on outer leg 82 may be released. The controls are then activated in the same fashion as would be done for unloading a load of full trusses. As rear truss support 52 is lowered to the unloading position, mono truss support control cable 84 will in turn lower mono truss support 78 to an unloading position, thereby allowing the mono trusses to slide to the ground in the same fashion as full trusses.

An optional configuration of a mono truss support can be provided in which the mono truss support is separately powered and can be operated without the need to activate truss support 52 on the rear bolster assembly. Separately activated mono truss support 200 (FIG. 7) consists of an inner support 204 rigidly mounted onto the forward portion of rear trailer assembly 14 adjacent to the centerline of truss trailer 10 and a mono truss support member 202. One end of mono truss support member 202 is pivotally mounted to inner support 204 at pivot point 206. Mono truss support member 202 is additionally provided with an intermediate support 208 and an outer support 210.

Intermediate support 208 has a first end rigidly mounted onto mono truss support member 202 at a point intermediate to pivot 206 and that end of mono truss support member 202 furthest from pivot 206 and a second end spaced apart from and generally above mono truss support member 202. Outer support 210 is rigidly affixed to mono truss support member 202 near that end of mono truss support member 202 which is farthest from pivot 206. Outer support 210 is positioned so that the second end of said outer support 210 is rigidly affixed to said second end of intermediate support 208 and thus the combination of intermediate support 208 and outer support 210 creates a triangular member rigidly affixed to and generally above mono truss support member 202.

At a point in proximity to the point where outer support 210 and intermediate support 208 are rigidly joined, piston rod 211 of hydraulic cylinder 212 is pivotally attached. The other end of hydraulic cylinder 212 is pivotally attached to the forward portion of rear trailer assembly 14 so that the action of the cylinder will be essentially parallel to a plane defined by mono truss support member 202 and the inner, intermediate, and outer supports 204, 208, and 210, respectively. It will be observed that extension of piston rod 211 of hydraulic cylinder 212 will cause the upper end of the intermediate support/outer support assembly to move away from the centerline of truss trailer 10 and thus cause mono truss support member 202 to rotate about pivot 206 which results in mono trusses which are supported on mono truss support member 202 being deposited on the ground.

If desired, hydraulic cylinder 212 may be a double acting cylinder similar to truss support control cylinder 68. If such a double acting cylinder is used, it will be mounted so as to activate left-hand and right-hand mono truss supports 200 in the same fashion that truss support control cylinder 68 activates left-hand and right-hand truss supports 52. When a double acting hydraulic cylinder is used, it will be activated by a control similar to control 72, which is capable of selectively lowering or raising either left-hand mono truss support member 202 or right-hand mono truss support member 202. In addition, each mono truss support 200 may be provided with a locking mechanism (not shown) which operates in the same fashion as locking mechanism 70.

Figure 9:
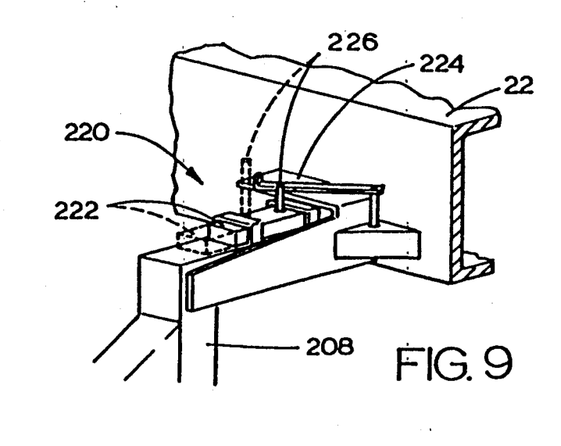
FIG. 9 is a partial view of the mono truss support showing the positive locking mechanism.

Mono truss support 200 may further be provided with a positive locking mechanism as shown in FIG. 9. This positive locking mechanism is mounted upon the upper portion of intermediate support 208 and consists of a slide bar 222 and a locking rod 226. The action of the locking mechanism will be understood from the following description. When slide bar 222 is moved to the point most remote from the centerline of truss trailer 10, mono truss support member 202 and combined intermediate support 208/outer support 210 are free to rotate around pivot 206 as piston rod 211 of hydraulic cylinder 212 is extended. When piston rod 211 of hydraulic cylinder 212 is retracted and mono truss support member 202 is in its horizontal load carrying position, slide bar 222 can be pushed toward the centerline of truss trailer 10. When slide bar 222 is moved toward the centerline of truss trailer 10, it will pass under a locking plate 224 which is rigidly mounted onto rear trailer assembly 14. In this position, mono truss step 202 is prevented from rotating about pivot 206. To maintain slide bar 222 in this locking position, locking rod 226 passes through slide bar 222 and engages a mating hole in intermediate support 208 effectively preventing slide bar 222 from accidentally becoming disengaged from locking plate 224.

When it is desired to lower the mono trusses to the ground, locking rod 226 is withdrawn and used as a handle to cause slide bar 222 to move in an outward direction and disengage from locking plate 224. Hydraulic cylinder 212 is activated and mono truss support member 202 is caused to rotate around pivot 206. (It will be understood that this is done simultaneously with the lowering of a corresponding truss support 52 on front truss supporting bolster 12.) As truss support 52, on front truss supporting bolster 12, and mono truss support member 200 rotate, the mono trusses will be deposited upon the ground. The procedure is then reversed and the forward truss support 52 and mono truss support member 202 are raised to their horizontal load carrying position and respectively locked in position.

As will be appreciated, this can be done with trusses fastened to the support. In addition, where desired, mono truss support member 202 can be provided with a removable truss brace (not shown) which will project perpendicularly to mono truss support member 202 and which may be used to assist in supporting mono trusses in an erect position. It will also be appreciated that a mono truss support 200 can be installed on one or both sides of rear trailer assembly 14 so that mono trusses may be hauled on one or both sides of the trailer.

It is thus seen that the unique improved truss transportation trailer of the instant invention provides a truss support trailer which may be easily and safely controlled by a single operator and which can be utilized to transport a large variety of truss sizes and configurations safely from the point of manufacture to the point of use. It will be further seen that the unique improved truss transportation trailer has certain improvements which enhance the safety, stability, and operation of the trailer. Although the present invention has been described with reference to a particular detailed embodiment thereof, it should be understood that the description is intended to be illustrative and not in a limiting sense. Many other variations may be devised by those skilled in the art which will fall within the true spirit and scope of the principles of this invention.

What is claimed is:

1. A trailer assembly suitable for hauling premanufactured trusses consisting of:

(1) a front bolster assembly comprising a means for attaching the trailer to the fifth wheel of a conventional tractor, a bolster base mounted thereon, an inner bolster riser mounted upon said bolster base, an outer bolster riser slidably surrounding said inner bolster riser, left and right truss supports mounted on the left and right sides of said outer bolster riser, each of which consists of a bolster riser pivot plate rigidly mounted to said outer bolster riser, an inner truss support riser having a first end pivotally mounted to said bolster riser pivot plate adjacent to said outer bolster riser and a second end remote therefrom, an outer truss support riser longer than said inner truss support riser having a first end pivotally mounted to said bolster riser pivot plate at a point separated from the point where the inner truss support riser is pivotally attached and a second end remote therefrom, a truss support having a first end pivotally attached to said second end of said inner truss support riser and a second end pivotally attached to said second end of said outer truss support riser whereby the differential length of said inner truss support riser and said outer truss support riser when they are rotated around their respective pivot points on the bolster riser pivot plate causes said truss support to move laterally away from said outer bolster riser before any significant angular change of said truss support with respect to said outer bolster occurs, locking means to hold said inner truss support riser in parallel relationship with said outer bolster riser, and power means for causing said inner and outer truss support risers to rotate around their respective pivot points on said bolster riser pivot plate and thus cause said truss support to move from a horizontal, truss-supporting position to an angled, truss-unloading position, said power means also acting to return said truss supports from said angled position to said horizontal position, and mechanical means for locking each truss support in said horizontal, truss supporting position, wherein said mechanical means comprises a first threaded member affixed to said outer bolster riser adjacent said inner truss support riser and a second fixture mounted on said inner truss support riser, which second fixture comprises a second threaded member sized to mate with said first threaded member and an engaging member affixed to said inner truss support riser, said second threaded member being releasably engaged with said engaging member;

(2) a rear trailer comprising a wheel and axle mechanism, a bolster base mounted thereon, an inner bolster riser mounted upon said bolster base, an outer bolster riser slidably surrounding said inner bolster riser, left and right truss supports mounted on the left and right sides of said outer bolster riser, each of which consists of a bolster riser pivot plate rigidly mounted to said outer bolster riser, an inner truss support riser having a first end pivotally mounted to said bolster riser pivot plate adjacent to said outer bolster riser and a second end remote therefrom, an outer truss support riser longer than said inner truss support riser having a first end pivotally mounted to said bolster riser pivot plate at a point separated from the point where the inner truss support riser is pivotally attached and a second end remote therefrom, a truss support having a first end pivotally attached to said second end of said inner truss support riser and a second end pivotally attached to said second end of said outer truss support riser whereby the differential length of said inner truss support riser and said outer truss support riser when they are rotated around their respective pivot points on the bolster riser pivot plate causes said truss support to move laterally away from said outer bolster riser before any significant angular change of said truss support with respect to said outer bolster occurs, locking means to hold said inner truss support riser in parallel relationship with said outer bolster riser, and power means for causing said inner and outer truss support risers to rotate around their respective pivot points on said bolster riser pivot plate and thus cause said truss support to move from a horizontal, truss-supporting position to an angled, truss-unloading position, said power means also acting to return said truss support from said angled position to said horizontal position, and mechanical means for locking each truss support in said horizontal, truss supporting position wherein said mechanical means comprises a first threaded member affixed to said outer bolster riser adjacent said inner truss support riser and a second fixture mounted on said inner truss support riser, which second fixture comprises a second threaded member sized to mate with said first threaded member and an engaging member affixed to said inner truss support riser, said second threaded member being releasably engaged with said engaging member; and (3) an extendable/retractable mechanism connecting said rear trailer to said front bolster assembly, said mechanism comprising an outer box beam slidably surrounding an inner box beam, means for changing the lateral relationship between said inner box beam and said outer box beam so as to shorten or lengthen the distance between said rear trailer and said front bolster assembly, and a positive means for locking the relative position of said outer box beam and said inner box beam so as to maintain the distance between said rear trailer and said front bolster assembly.

2. A truss trailer assembly according to claim 1 wherein said extendable/retractable box beam is equipped with a locking device consisting of a plurality of sleeved holes in said inner box beam, a slot in said outer box beam, an enclosed pocket over the forward portion of said slot, which pocket has an opening towards the rear portion of said slot, vertical plates at either side of the rear of said slot, said plates having a hole therein which holes have a common axis, a locking member consisting of a lock pin sized to slidably engage one of the sleeved holes in said inner box beam, and a lock bar sized to mate with said pocket overlaying the forward portion of said slot in said outer box beam, said lock bar having a hole transverse therethrough whereby when said lock pin is engaged with one of said holes in said inner box beam and said lock bar is mated within said pocket, said pin may be inserted through said hole in one of said vertical plates, said hole in the lock bar, and said hole in the second lock plate whereby said locking member is held rigidly engaged with said inner box beam and said inner and outer box beam are prevented from movement with respect to each other.

3. A truss trailer assembly according to claim 1 wherein means is provided for moving said outer box beam laterally along said inner box beam.

4. A truss trailer assembly according to claim 1 wherein said front and rear bolster assemblies are equipped with means for raising and lowering said outer bolster riser in relationship to said inner bolster riser.

5. A truss trailer assembly according to claim 4 wherein said means is an hydraulic cylinder.

6. A truss trailer assembly according to claim 4 wherein said bolster assembly is equipped with means for stabilizing said outer bolster riser assembly against tipping with respect to said bolster base.

7. A truss trailer assembly according to claim 6 wherein said means for stabilizing said outer bolster riser assembly against tipping with respect to said bolster base consists of mirror image structures mounted on opposite sides of said bolster riser, each of said mirror image structures consisting of: (1) a stabilizer bar pivotally mounted onto said bolster base at a point laterally distant from said bolster riser, said stabilizer bar having a plurality of latching means spaced along the length of said stabilizer bar, (2) complementary means mounted on said bolster riser pivot plate capable of engaging said latching means, whereby as said outer bolster riser is raised with respect to said inner bolster riser, successive latching means on each of said stabilizer bars engage said complementary means on said bolster riser pivot plate so that at any particular elevation of said outer bolster riser, positive support is provided on opposite sides of said outer bolster riser to prevent said outer bolster riser from tipping with respect to said bolster base.

8. A truss trailer assembly according to claim 7 wherein said plurality of latching means on each of said stabilizer bars consists of a plurality of spaced hook-shaped cutouts on said stabilizer bar and wherein said complementary means on said outer riser pivot plate consists of a cylindrical member sized to firmly engage said hookshaped cutouts.

9. A truss trailer assembly according to claim 1 equipped with a device attached to the forward end of said rear trailer, which device permits said truss trailer assembly to haul mono trusses, said device consisting of:

(1) a mono truss support member having a first end pivotally attached to said trailer at a point spaced apart from the outer edge of said trailer and a second end being in closer proximity to said outer edge of said trailer, (2) a means for supporting said mono truss support member in a load supporting position wherein said mono truss support member is substantially parallel to said truss support when said truss support is in its horizontal, truss supporting position, and (3) a means associated with said trailer assembly whereby said mono truss support member can be rotated around said pivotally mounted first end to cause said second end to be lowered in closer proximity to the ground surface.

10. A truss trailer assembly according to claim 9 wherein said means for rotating said mono truss support member is a hydraulic cylinder capable of raising and lowering said second end of said mono truss support member.

11. A truss trailer assembly according to claim 9 having a positive locking device which consists of a locking bar, which may be interposed between a portion of said mono truss support member, and a latch member mounted on said trailer assembly so as to physically prevent rotation of said mono truss support member about said pivot point.

12. A trailer assembly according to claim 1 having a stabilizer assembly which consists of mirror image structures mounted on opposite sides of said bolster riser, each of said mirror image structures consisting of:

(1) a stabilizer bar which is pivotally mounted onto said bolster base at a point laterally distant from said bolster riser and having a plurality of latching means spaced along the length of said stabilizer bar and (2) complementary means which is mounted on said outer bolster riser and are capable of engaging said latching means whereby as said outer bolster riser is raised with respect to said inner bolster riser, successive latching means on each of said stabilizer bars engage said complementary means on said outer bolster riser so that at any particular elevation of said outer bolster riser, positive support is provided on opposite sides of said outer bolster riser to prevent said outer bolster riser from tipping with respect to said bolster base.

13. A stabilizer assembly according to claim 12 wherein said plurality of latching means on each of said stabilizer bars consists of a plurality of spaced hook-shaped cutouts on said stabilizer bar and wherein said complementary means consists of a cylindrical member sized to firmly engage said hook-shaped cutouts.

14. A trailer assembly according to claim 1 which trailer assembly is additionally provided with a device which enables said truss trailer assembly to haul mono trusses, said device consisting of:

(1) a mono truss apex support member having a first end pivotally attached to said trailer at a point closer to the surface upon which the truss trailer is resting than said truss support and spaced apart from the outer edge of said trailer and a second end being in closer proximity to said outer edge of said trailer, (2) a means for supporting said mono truss apex support member in a position to support the apex of one or more mono trusses wherein said mono truss apex support member is substantially parallel to the surface upon which the truss trailer is resting and nearer to said surface than said truss support members of said trailer, and (3) a means whereby said mono truss apex support member can be rotated around said pivotally mounted first end to cause said second end to be lowered in closer proximity to said surface.

15. A device according to claim 14 wherein said means for rotating said mono truss apex support member is an hydraulic cylinder capable of raising and lowering said second end of said mono truss apex support member.

16. A device according to claim 14 having a positive locking device which consists of a locking bar, which may be interposed between a portion of said mono truss apex support member, and a latch member mounted on said trailer assembly so as to physically prevent rotation of said mono truss apex support member about said pivot point.

17. A stabilizer assembly for installation on a truss trailer assembly useful for hauling premanufactured trusses, which trailer assembly includes a bolster assembly comprising a bolster base, an inner bolster riser mounted upon said bolster base, and an outer bolster riser slidably surrounding said inner bolster riser, which stabilizer assembly consists of mirror image structures mounted on opposite sides of said bolster riser, each of said mirror image structures consisting of:

(1) a stabilizer bar which may be pivotally mounted onto said bolster base at a point laterally distant from said bolster riser and having a plurality of latching means spaced along the length of said stabilizer bar and (2) complementary means which may be mounted on said outer bolster riser and are capable of engaging said latching means whereby as said outer bolster riser is raised with respect to said inner bolster riser, successive latching means on each of said stabilizer bars engage said complementary means on said outer bolster riser so that at any particular elevation of said outer bolster riser, positive support is provided on opposite sides of said outer bolster riser to prevent said outer bolster riser from tipping with respect to said bolster base.

18. A stabilizer assembly according to claim 17 wherein said plurality of latching means on each of said stabilizer bars consists of a plurality of spaced hook-shaped cutouts on said stabilizer bar and wherein said complementary means consists of a cylindrical member sized to firmly engage said hook-shaped cutouts.

* * * * *